(12) United States Patent
Salit et al.

(10) Patent No.: US 11,396,569 B2
(45) Date of Patent: Jul. 26, 2022

(54) RUBBER COMPOSITION

(71) Applicant: COMPAGNIE GENERALE DES ETABLISSEMENTS MICHELIN, Clermont-Ferrand (FR)

(72) Inventors: Anne-Frédérique Salit, Clermont-Ferrand (FR); Anne-Lise Thuilliez, Clermont-Ferrand (FR); Céline Ledoux, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 3 days.

(21) Appl. No.: 16/770,692

(22) PCT Filed: Oct. 11, 2018

(86) PCT No.: PCT/FR2018/052521
§ 371 (c)(1),
(2) Date: Jun. 8, 2020

(87) PCT Pub. No.: WO2019/122547
PCT Pub. Date: Jun. 27, 2019

(65) Prior Publication Data
US 2021/0087316 A1    Mar. 25, 2021

(30) Foreign Application Priority Data
Dec. 20, 2017 (FR) .................................. 1762562

(51) Int. Cl.
*C08F 236/08* (2006.01)
*B60C 1/00* (2006.01)
(Continued)

(52) U.S. Cl.
CPC .......... *C08F 236/08* (2013.01); *B60C 1/0041* (2013.01); *C08F 236/06* (2013.01); *C08K 3/04* (2013.01); *C08F 2800/10* (2013.01)

(58) Field of Classification Search
USPC ........................................................ 524/572
See application file for complete search history.

(56) References Cited

U.S. PATENT DOCUMENTS 5,140,055 A * 8/1992 Hirata ................... B60C 1/0016
  152/DIG. 14
5,346,962 A * 9/1994 Hergenrother ...... C08F 290/048
  525/244
(Continued)

FOREIGN PATENT DOCUMENTS

JP  2010202867 A   9/2010
RU  2570882 C2   12/2015
(Continued)

OTHER PUBLICATIONS

International Search Report and Written Opinion corresponding to PCT/FR2018/052521 dated Mar. 11, 2019.

*Primary Examiner* — Fred M Teskin
(74) *Attorney, Agent, or Firm* — Dickinson Wright PLLC (57) ABSTRACT

A rubber composition based at least on a functional elastomer and a reinforcing filler which comprises a carbon black is provided. The functional elastomer is a diene elastomer which comprises diene units in the cis-1,4 configuration and pendant groups of formula (I). The $Y_1$, $Y_2$, $Y_3$ and $Y_4$ symbols, which are identical or different, represent an atom or a group of atoms, and at least one of the symbols denotes an attachment to a diene unit of the elastomer. The diene units in the cis-1,4 configuration represent at least 90 mol % of the diene units of the functional elastomer, and the carbon black represents more than 50% by weight of the reinforcing filler.

(Continued)

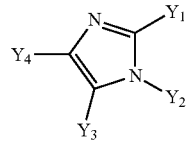

(I)

17 Claims, 4 Drawing Sheets (51) Int. Cl.
*C08F 236/06* (2006.01)
*C08K 3/04* (2006.01)
*C08L 15/00* (2006.01)
*C08C 19/22* (2006.01)

(56) References Cited

U.S. PATENT DOCUMENTS

| 8,650,850 B2 * | 2/2014 | Barguet ............... D07B 1/0633 |
| | | 57/212 |
| 2013/0012652 A1 | 1/2013 | Araujo Da Silva et al. |
| 2016/0251456 A1 | 9/2016 | Ugolnikov et al. |
| 2016/0263943 A1 | 9/2016 | Gander et al. |
| 2016/0264753 A1 | 9/2016 | Salit et al. |
| 2018/0346617 A1 | 12/2018 | Fleury et al. |

FOREIGN PATENT DOCUMENTS

| WO | WO 96/37547 | * 11/1996 | ............... C08K 9/06 |
| WO | 2015059269 A1 | 4/2015 | |
| WO | 2015059271 A1 | 4/2015 | |
| WO | 2015059274 A1 | 4/2015 | |
| WO | 2017089708 A1 | 6/2017 | |

* cited by examiner

RUBBER COMPOSITION

This application is a 371 national phase entry of PCT/FR2018/052521 filed on 11 Oct. 2018, which claims benefit of French Patent Application No. 1762562, filed 20 Dec. 2017, the entire contents of which are incorporated herein by reference for all purposes.

BACKGROUND

1. Technical Field

The present invention relates to diene rubber compositions predominantly reinforced with carbon black which are intended to be used in particular in a tire.

2. Related Art

Natural rubber still remains a diene elastomer widely used in rubber compositions, even if for several decades it has been partially replaced in rubber compositions by synthetic diene elastomers such as polybutadiene, synthetic polyisoprene and butadiene/styrene copolymers. As the production of natural rubber can vary greatly depending on climatic or geopolitical vagaries, it may be strategic to want to minimize any impact of a sudden variation in the production of natural rubber on the manufacture of rubber articles. However, the replacement of natural rubber with a synthetic elastomer in a rubber composition predominantly reinforced with carbon black is accompanied by a decrease in the mechanical strength properties in the uncured state of the rubber composition. Yet these mechanical strength properties in the uncured state, i.e. before crosslinking, are generally important in the operations for assembling multiple rubber components which are still in the uncured state, such as for example in the manufacture of a tire. A high mechanical strength in the uncured state of the constituent rubber compositions of the rubber components of the assembly makes it possible to guarantee the dimensional stability of the assembly, in particular by preventing the flow of the rubber components. A high mechanical strength in the uncured state of a rubber composition also makes it possible to maintain the thread gap in fabrics, rubber components comprising thread-like reinforcing elements, for example textile or metallic reinforcing elements, coated in the rubber composition.

SUMMARY

The Applicant Company has discovered, surprisingly, that a rubber composition predominantly reinforced with carbon black and comprising an elastomer that is both functional and stereoregular could be replaced by a rubber composition predominately reinforced with carbon black and comprising natural rubber, without being to the detriment of the good mechanical strength properties in the uncured state.

Thus, a first subject of the invention is a rubber composition based at least:
on a functional elastomer, which functional elastomer is a diene elastomer which comprises diene units in the cis-1,4 configuration and pendant groups of formula (I)

(I)

in which:
the $Y_1$, $Y_2$, $Y_3$ and $Y_4$ symbols, which are identical or different, represent an atom or a group of atoms, knowing that at least one of the symbols denotes an attachment to a diene unit of the elastomer,
the diene units in the cis-1,4 configuration representing at least 90 mol % of the diene units of the functional elastomer,
a reinforcing filler which comprises a carbon black, the carbon black representing more than 50% by weight of the reinforcing filler.

A second subject of the invention is a composite comprising a rubber composition in accordance with the invention and at least one reinforcing element coated in the rubber composition.

A third subject of the invention is a semi-finished article for a tire comprising a rubber composition in accordance with the invention or a composite in accordance with the invention.

A fourth subject of the invention is a tire comprising a rubber composition in accordance with the invention, a composite in accordance with the invention or a semi-finished article in accordance with the invention.

The invention also relates to a process for manufacturing a rubber composition in accordance with the invention.

I. DETAILED DESCRIPTION

The abbreviation "phr" means parts by weight per hundred parts of elastomer (of the total of the elastomers, if several elastomers are present).

Furthermore, any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b).

The expression "composition based on" should be understood as meaning, in the present description, a composition comprising the mixture and/or the in situ reaction product of the various constituents used, some of these base constituents (for example the elastomer, the filler or other additive conventionally used in a rubber composition intended for the manufacture of tires) being capable of reacting or intended to react with one another, at least in part, during the various phases of manufacture of the composition intended for the manufacture of tires.

The compounds mentioned in the description may be of fossil or biobased origin. In the latter case, they may be partially or completely derived from biomass or be obtained from renewable raw materials derived from biomass.

The functional elastomer of use for the requirements of the invention is a diene elastomer. A diene elastomer is understood to mean an elastomer which comprises diene units. A diene unit is understood to mean a unit which contains a carbon-carbon double bond and which results from the insertion of a diene monomer into a growing chain during the polymerization reaction. The functional elastomer has the distinctive feature of having diene units in the cis-1,4 configuration. These diene units in the cis-1,4 configuration are well known to a person skilled in the art: they result from a particular insertion of a conjugated diene into the growing polymer chain during the polymerization reaction. The diene units in the cis-1,4 configuration, also referred to as cis-1,4 units, represent at least 90 mol % of the diene units of the functional elastomer. This content of cis-1,4 units in the functional elastomer corresponds to a degree of stereoregularity of greater than or equal to 90%. Preferably, the cis-1,4 units represent at least 95 mol % of the diene units of the functional elastomer, which corresponds to a degree of stereoregularity of greater than or equal to 95%. Advantageously, the diene units of the functional elastomer in the cis-1,4 configuration represent more than 90 mol % of the constitutional repeating units, also denoted under the abbreviation CRU by IUPAC) of the functional elastomer.

Preferably, the diene units of the functional elastomer are 1,3-butadiene units or isoprene units.

The functional elastomer of use for the requirements of the invention also has the distinctive feature of bearing functional groups. The functional groups are pendant groups of formula (I).

(I)

In formula (I), the $Y_1$, $Y_2$, $Y_3$ and $Y_4$ symbols, which are identical or different, represent an atom or a group of atoms, knowing that at least one of the symbols denotes an attachment to a diene unit of the elastomer. In the present application, a group of atoms is understood to mean a sequence of atoms covalently bonded to form a chain. A person skilled in the art understands that the functional groups are attached to the elastomer by covalent bonding. According to any one of the embodiments of the invention, preferably a single symbol denotes an attachment to a diene unit of the elastomer. The attachment to a diene unit may be direct or indirect, i.e. through a group of atoms. It is preferably indirect.

When neither $Y_3$, nor $Y_4$ denotes an attachment to a diene unit, $Y_3$ and $Y_4$ may form, with the two carbon atoms to which they are attached, a ring, in particular an aromatic ring.

According to a preferred embodiment of the invention, the $Y_2$ symbol denotes the attachment to a diene unit of the elastomer.

According to another preferred embodiment of the invention, the $Y_3$ and $Y_4$ symbols are each a hydrogen atom and the $Y_1$ symbol represents a hydrogen atom or a carbon chain which may contain at least one heteroatom. In the present application, a carbon chain is understood to mean a chain which contains one or more carbon atoms.

According to a very particularly preferred embodiment, the $Y_2$ symbol denotes the attachment to a diene unit of the elastomer, the $Y_3$ and $Y_4$ symbols are each a hydrogen atom and the $Y_1$ symbol represents a hydrogen atom or a carbon chain which may contain at least one heteroatom.

Advantageously, $Y_1$ is a hydrogen atom or an alkyl group. When the $Y_1$ symbol represents an alkyl group, the alkyl group is preferentially a $C_1$-$C_6$ alkyl, more preferentially a methyl. A $C_1$-$C_6$ alkyl is understood to mean an alkyl which contains from 1 to 6 carbon atoms.

According to any one of the embodiments of the invention, the pendant groups of formula (I) are preferably distributed randomly along the elastomer chain.

The molar content of pendant groups of formula (I) in the functional elastomer is preferentially at most 3 mol % in order to minimize the additional cost of the functional elastomer compared to a non-functional elastomer. It varies preferentially within a range which extends from more than 0 mol % to 3 mol % of the constitutional repeating units of the functional elastomer, for example from 0.02 mol % to 3 mol % of the constitutional repeating units of the functional elastomer, more preferentially still from 0.1 mol % to 3 mol % of the constitutional repeating units of the functional elastomer. These preferential ranges may apply to any one of the embodiments of the invention.

According to a particular embodiment of the invention, the functional elastomer may be a mixture of several elastomers which may differ from one another in their microstructure or their macrostructure. Each of the elastomers making up the mixture corresponds to the definition of the functional elastomer of use for the requirements of the invention both from the point of view of the stereoregularity and of the functionalization.

According to any one of the embodiments of the invention, the functional elastomer is preferentially other than a modified natural rubber. In particular, it is preferentially obtained by modification of a synthetic diene elastomer.

According to a particularly preferred embodiment of the invention, the functional elastomer is a diene elastomer, a portion of the diene units of which are modified by grafting of a compound, compound C, which contains a group that is reactive with respect to carbon-carbon double bonds and a group of formula (II) in which the $Z_1$, $Z_2$, $Z_3$ and $Z_4$ symbols, which are identical or different, represent an atom or a group of atoms, knowing that at least one of the symbols denotes an attachment to the reactive group. Preferably, a single symbol designates an attachment to the reactive group.

(II)

When neither $Z_3$, nor $Z_4$ denotes an attachment to the reactive group, $Z_3$ and $Z_4$ may form, with the two carbon atoms to which they are attached, a ring, in particular an aromatic ring.

In formula (II), the $Z_2$ symbol preferably denotes the attachment to the reactive group. Preferably, the $Z_3$ and $Z_4$ symbols each represent a hydrogen atom and the $Z_1$ symbol represents a hydrogen atom or a carbon chain that may contain at least one heteroatom, in particular an alkyl, more particularly a $C_1$-$C_6$ alkyl. Advantageously, the alkyl group represented by $Z_1$ is a methyl.

In other words, the functional elastomer is, according to this particularly preferred embodiment of the invention, a modified diene elastomer which is obtained by modification of a starting diene elastomer by a grafting reaction of the compound C. Preferably, the functional elastomer is obtained by modification of a synthetic diene elastomer. In other words, the starting diene elastomer is preferentially a synthetic diene elastomer. It is commonly accepted that natural rubber is not a synthetic diene elastomer, since it is extracted from the rubber tree. Mention may be made, as a synthetic diene elastomer that is very particularly suitable, of a polybutadiene or a synthetic polyisoprene. A person skilled in the art understands that polybutadiene and polyisoprene as starting diene elastomer, typically have a stereoregularity close to that of the functional elastomer, in particular a content of cis-1,4 units of greater than or equal to 90%, preferentially greater than or equal to 95%.

According to this particularly preferred embodiment of the invention, the functional elastomer comprises both diene units and diene units modified by the grafting of the compound C. Preferably, the constitutional repeating units of the functional elastomer are diene units and diene units modified by the grafting of the compound C. In other words, preferentially in the functional elastomer there are no units other than the diene units and the modified diene units which bear the group of formula (I).

Preferably, the compound C is a 1,3-dipolar compound. The term "1,3-dipolar compound" is understood according to the definition given by the IUPAC. It has the feature of comprising a single dipole and the group of formula (II). The dipole constitutes the reactive group of the compound C that is reactive with respect to carbon-carbon double bonds. The dipole typically reacts with the carbon-carbon double bonds of diene units. Bringing the starting diene elastomer together with the compound C leads to the modification of a portion of the diene units of the starting diene elastomer. The 1,3-dipolar compound of use for the requirements of the invention is preferably an aromatic nitrile monoxide. An aromatic nitrile monoxide compound is understood to mean an aromatic compound which contains a single nitrile oxide dipole and in which the benzene ring is substituted by the nitrile oxide dipole, which means that the carbon atom of the dipole is directly bonded via a covalent bond to a carbon atom of the benzene ring. Advantageously, the benzene ring is substituted in the position ortho to the dipole.

Advantageously, the 1,3-dipolar compound contains a moiety of formula (III) in which four of the six $R_1$ to $R_6$ symbols, which are identical or different, are each an atom or a group of atoms, knowing that the fifth symbol represents an attachment to the group of formula (II) and the sixth symbol a direct attachment to the dipole.

(III)

In formula (III), the $R_1$ and $R_5$ symbols are preferably both other than a hydrogen atom, which makes it possible to confer a greater stability of the 1,3-dipolar compound and thus an easier use of the 1,3-dipolar compound.

In formula (III), the $R_1$, $R_3$ and $R_5$ symbols each preferably represent a a hydrocarbon group, more preferentially an alkyl group, more preferentially still a methyl or ethyl group.

In formula (III), the $R_2$ and $R_4$ symbols are each preferentially a hydrogen atom.

In formula (III), the $R_1$, $R_3$ and $R_5$ symbols each preferably represent a hydrocarbon group, more preferentially an alkyl group, more preferentially still a methyl or ethyl group and the $R_2$ and $R_4$ symbols each preferentially a hydrogen atom. With a benzene ring thus substituted, the synthesis of the 1,3-dipolar compound may then be carried out using a relatively easy synthesis route using a commercially available precursor, for example mesitylene, as is described for example in document WO 2015059269.

In formula (III), the fifth symbol is attached to the group of formula (II), preferably through a group of atoms referred to as a spacer. The spacer is preferably a carbon chain which may contain at least one heteroatom. The spacer preferably contains 1 to 6 carbon atoms, in particular 1 to 3 carbon atoms. The spacer is more preferentially an alkanediyl group, better still a methanediyl group.

According to any one of the embodiments of the invention, the 1,3-dipolar compound is advantageously the compound 2,4,6-trimethyl-3-((2-methyl-1H-imidazol-1-yl)methyl)benzonitrile oxide of formula (III-a) or the compound 2,4,6-triethyl-3-((2-methyl-1H-imidazol-1-yl)methyl)benzonitrile oxide of formula (III-b), more advantageously the compound of formula (III-a).

(IIIa)

(III-b)

The reinforcing filler of use for the requirements of the invention has the essential feature of comprising a carbon black, which carbon black represents more than 50% by weight of the reinforcing filler. All carbon blacks, in particular the blacks conventionally used in tires, in particular the reinforcements such as the carcass reinforcements or the crown reinforcement, are suitable as carbon blacks. Mention may very particularly be made of the ASTM grades of the 300 to 700 series, or alternatively the HAF, FF, FEF, GPF and SRF grades.

Preferably, the carbon black represents more than 90% by weight of the reinforcing filler. The carbon black may also constitute all of the reinforcing filler for any one of the embodiments of the invention.

The content of carbon black in the rubber composition may vary to a large extent. It is adjusted depending on the use for which the rubber composition is intended, in particular in a tire. When the rubber composition is intended to form a reinforcement for a tire, the content of carbon black is preferentially within a range extending from 30 to 80 phr. A content below 30 phr may lead to a reinforcement of the rubber composition after crosslinking which may be judged to be insufficient for use in a composite which comprises a reinforcing element, for example in a reinforcement for a tire. A content above 80 phr may be accompanied by a degree of rigidity which may be considered to be too high for use in a reinforcement.

The rubber composition in accordance with the invention may also comprise all or some of the usual additives customarily used in the compositions. The rubber composition particular comprise an elastomer other than the functional elastomer. In particular, this other elastomer may be an unmodified elastomer, for example the starting elastomer used in the preparation of the functional elastomer. This other elastomer may also be a natural rubber. The content of the functional elastomer in the rubber composition in accordance with the invention is preferentially at least 50 phr, more preferentially at least 75 phr, more preferentially still at least 90 phr. The content of functional elastomer in the rubber composition therefore varies preferentially from 50 to 100 phr, more preferentially from 75 to 100 phr, more preferentially still from 90 to 100 phr. These preferential contents of functional elastomer in the rubber composition may apply to any one of the embodiments of the invention.

The rubber composition may contain an elastomer crosslinking system. The crosslinking system can be a vulcanization system or be based on one or more peroxide compounds, for example conventionally used in rubber compositions that can be used for the manufacture of tires. The crosslinking system is preferentially a vulcanization system, that is to say a system based on sulfur (or on a sulfur donor) and on a primary vulcanization accelerator. Various known secondary vulcanization accelerators or vulcanization activators, such as zinc oxide, stearic acid or equivalent compounds, or guanidine derivatives (in particular diphenylguanidine), or else known vulcanization retarders, are added to this base vulcanization system, being incorporated during the first non-productive phase and/or during the productive phase, as described subsequently. The sulfur is used at a preferred content of between 0.5 and 12 phr, in particular between 1 and 10 phr. The primary vulcanization accelerator is used at a preferred content of between 0.5 and 10 phr.

When the rubber composition is intended to be used in a composite which comprises at least one metal reinforcing element, the rubber composition contains sulfur, preferentially at a content which may be greater than 2 phr and may reach up to 8.5 phr, preferably from 3.5 to 7 phr. In the rubber compositions intended to be bought into contact with at least one metal reinforcing element, the surface of which is brass-plated, a portion of the sulfur is consumed in the formation of a bonding interface between the rubber composition and the metal.

Therefore, the sulfur is present in such rubber compositions intended for the preparation of composites or layers adjacent to these composite, in proportions greater than those customarily used in other compositions, for example for treads.

The rubber composition may also contain other additives known for being used in rubber compositions for tires, such as pigments, processing aids, antiozonants, antioxidants, systems for promoting adhesion with respect to metal, in particular brass-plated, reinforcers, such as for example metal salts such as organic cobalt or nickel salts. Those skilled in the art will know how to adjust the formulation of the composition depending on their specific requirements.

When the rubber composition is intended to be used in a composite which comprises at least one metal reinforcing element, the rubber composition may further comprise at least one adhesion promoter, preferably a cobalt compound. This cobalt compound is preferentially an organic cobalt compound, typically chosen from cobalt carboxylates, compounds that are well known for being used as adhesion promoter. The content thereof in the rubber composition is preferentially between 0.1 and 10 phr, more preferentially between 0.3 and 6 phr, in particular between 0.5 and 4 phr.

The rubber composition in accordance with the invention is typically manufactured in appropriate mixers, using two successive phases of preparation well known to a person skilled in the art: a first phase of thermomechanical working or kneading ("non-productive" phase) at high temperature, up to a maximum temperature of between 130° C. and 200° C., followed by a second phase of mechanical working ("productive" phase) up to a lower temperature, typically below 110° C., for example between 40° C. and 100° C., during which finishing phase the crosslinking system is incorporated.

The rubber composition, according to a particular embodiment of the invention, may be manufactured according to a process, another subject of the invention, which comprises the following steps:

during a first "non-productive" step, kneading a starting diene elastomer having a molar content of cis-1,4 units of greater than or equal to 90%, preferentially greater than or equal to 95%, and a compound C by thermomechanically kneading, the compound C being as defined above, then adding the reinforcing filler, where appropriate the other ingredients of the rubber composition with the exception of the crosslinking system by mechanically kneading until a maximum temperature of between 130° C. and 200° C. is reached, cooling the combined mixture to a temperature of less than 100° C., subsequently incorporating the crosslinking system, kneading everything up to a maximum temperature of less than 120° C.

The final composition thus obtained may then be calendered, for example in the form of a sheet or a slab, or else extruded, for example in order to form a rubber profiled element used for the manufacture of a composite or a semi-finished product, such as, for example, a reinforcement for a tire.

The rubber composition in accordance with the invention, which may be either in the uncured state (before crosslinking or vulcanization) or in the cured state (after crosslinking or vulcanization), can be used in a semi-finished article for a tire, which is another subject of the invention.

According to a particular embodiment of the invention, the rubber composition is used in a composite, which is another subject of the invention. The composite in accordance with the invention also has the essential feature of comprising at least one reinforcing element coated in the rubber composition defined according to any one of the embodiments of the invention. The composite may be manufactured by a process which comprises the following steps: producing two layers of the rubber composition, sandwiching each reinforcing element in the two layers by depositing it between the two layers, and if necessary crosslinking the functional elastomer, in particular by vulcanization. The layers may be produced by calendering.

The reinforcing element, also referred to as a reinforcer, may be metal or textile. In the present application, "textile" is understood to mean, in a manner well known to those skilled in the art, any material made of a substance other than a metallic substance, whether natural or synthetic, which is capable of being transformed into thread, fibre or film by any appropriate transformation process. Mention may be made, for example, without the examples below being limiting, of a polymer spinning process, such as, for example, melt spinning, solution spinning or gel spinning. The textile reinforcer may be made of polymer material, of both thermoplastic and non-thermoplastic type, of natural or synthetic origin. Any textile reinforcer known for being able to be used in a reinforcement for a tire is suitable.

The reinforcer may be in various forms, preferably in the form of an individual thread (monofilament) or an assembly of threads, whether these threads are twisted together (for example, in the form of a cord) or are essentially parallel to one another. The reinforcer is more preferentially in the form of an individual thread or an assembly of threads, for example a cord or a strand manufactured with cabling or stranding devices and processes known to a person skilled in the art, which are not described here for the simplicity of the description. The reinforcer may also be in the form of a ribbon or film, or also of a fabric produced from threads or fibres, for example a woven fabric with warp threads and weft threads, or else a twill fabric with cross threads. The term "thread" or "fibre" is generally understood to mean any elongate element of great length relative to its cross section, regardless of the shape, for example circular, oblong, rectangular, square, or even flat, of this cross section, it being possible for this thread to be straight or not straight, for example twisted or wavy. The largest dimension of its cross section is preferentially less than 5 mm, more preferentially less than 3 mm. The term "film" or "ribbon" is generally understood to mean an elongate element of great length relative to its cross section, the cross section of which has an aspect ratio (width to thickness) of greater than 5, preferably of greater than 10, and the width of which is preferentially at least equal to 3 mm, more preferentially at least equal to 5 mm.

When a metal reinforcer is used, use is preferably made of a reinforcer made of steel, in particular made of pearlitic (or ferritic-pearlitic) carbon steel, referred to in a known manner as "carbon steel", or else made of stainless steel as described for example in patent application EP-A-648 891 or WO98/41682. However, it is of course possible to use other steels or other alloys. When the steel is a carbon steel, its carbon content is preferably between 0.01% and 1.2% or between 0.05% and 1.2%, or else between 0.2% and 1.2%, in particular between 0.4% and 1.1%. When the steel is stainless, it preferably comprises at least 11% of chromium and at least 50% of iron.

When the composites of the invention are used to reinforce carcass or crown reinforcements of radial tires, the reinforcers used are preferably assemblies (strands or cords) of thin carbon steel or stainless steel threads having:

- a tensile strength of greater than 2000 MPa, more preferentially greater than 2500 MPa, in particular greater than 3000 MPa; a person skilled in the art knows how to manufacture thin threads having such a strength, by adjusting in particular the composition of the steel and the degrees of final work-hardening of these threads;
- for a good strength/bending strength/feasibility compromise, a diameter of between 0.10 and 0.40 mm, more preferentially between 0.10 and 0.30 mm approximately when the composite is intended to reinforce a carcass reinforcement, or between 0.20 and 0.40 mm approximately when the composite is intended to reinforce a crown reinforcement.

The composite may be used in a semi-finished article such as a reinforcement for a tire.

According to one embodiment of the invention, the semi-finished article is a reinforcement for a tire. The reinforcement for a tire is preferably a carcass reinforcement or a crown reinforcement.

Figure 1:
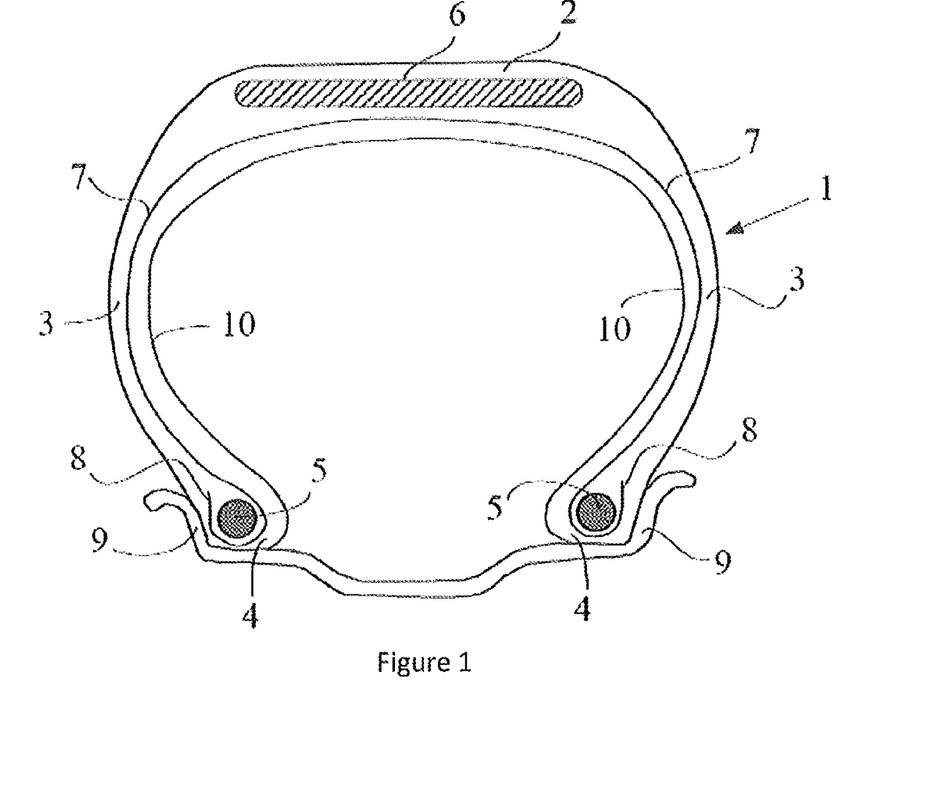
FIG. 1 schematically depicts a radial section of a tire with a radial carcass reinforcement in accordance with an example embodiment.

By way of example, FIG. 1 schematically depicts a radial section of a tire 1 with a radial carcass reinforcement in accordance with the invention. The tire 1 comprises a crown 2, two sidewalls 3, two beads 4, a carcass reinforcement 7 extending from one bead to the other. The crown 2, surmounted by a tread (not represented in this schematic figure, for simplification) is, in a manner known per se, reinforced by a crown reinforcement 6 consisting for example of at least two superposed crossed crown plies ("working" crown plies). The carcass reinforcement 7 is wound around the two bead wires 5 in each bead 4, the turn-up 8 of this reinforcement 7 being, for example, positioned towards the outside of the tire 1, which is represented here fitted onto its wheel rim 9. The carcass reinforcement 7 is composed of at least one ply reinforced by "radial" cords, that is to say that these cords are positioned virtually parallel to one another and extend from one bead to the other so as to form an angle of between 80° and 90° with the median circumferential plane (plane perpendicular to the axis of rotation of the tire which is located halfway between the two beads 4 and passes through the middle of the crown reinforcement 6). Of course, this tire 1 also comprises, in a known manner, a layer of rubber or elastomer 10 commonly referred to as an inner lining or airtight layer, which defines the radially inner face of the tire and which is intended to protect the carcass ply from the diffusion of air originating from the space inside the tire. Advantageously, in particular in the case of a tire for a heavy-duty vehicle, it may further comprise a reinforcing intermediate elastomer layer (not represented in the figure) which is located between the carcass ply and the airtight layer.

The invention relates to the rubber composition, the composite, the semi-finished article and the tire in the uncured state (before crosslinking of the elastomer) or cured state (after crosslinking of the elastomer). Generally, during the manufacture of the tire, the composite or the semi-finished article is deposited in the uncured state (i.e. before crosslinking of the elastomer) in the structure of the tire before the step of curing the tire.

Figure 2:
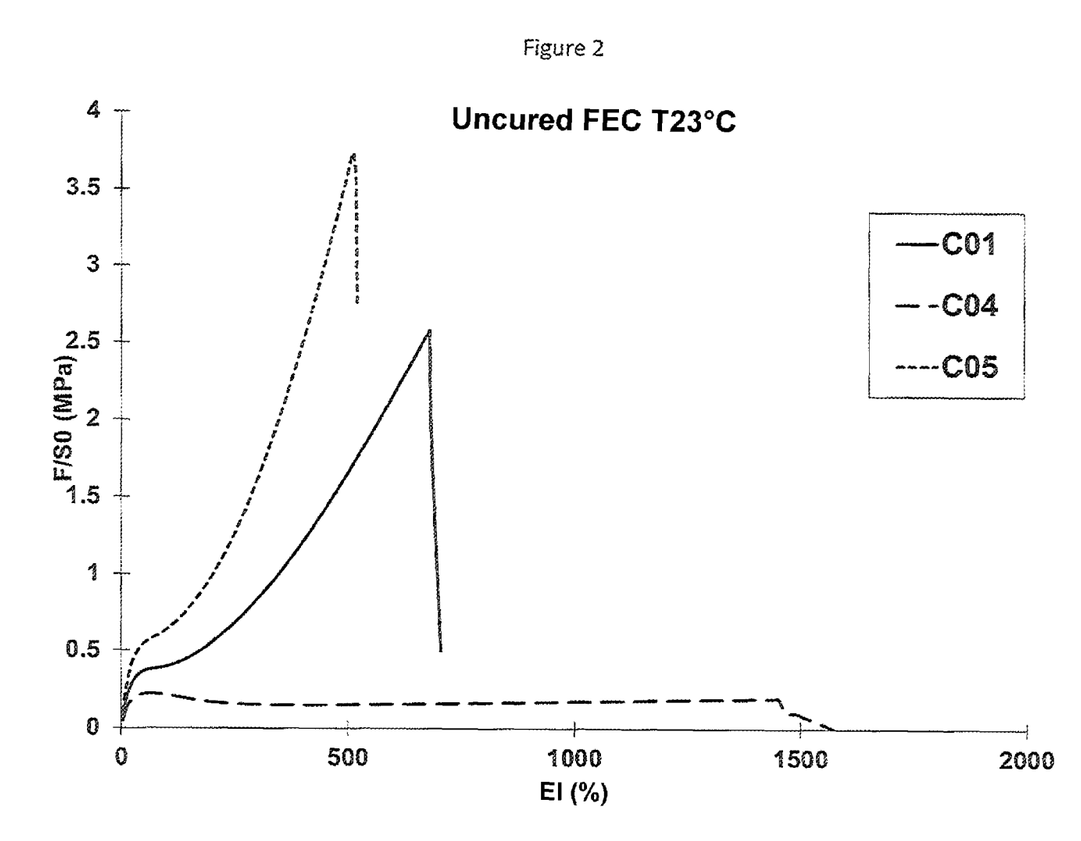
FIG. 2 is a graph of apparent stress curves $F/S_0$ (MPa) as a function of deformation (%) relating to non-crosslinked test specimens (uncured force-elongation curve or uncured FEC) according to an example embodiment.

The abovementioned characteristics of the present invention, and also others, will be better understood on reading the following description of several exemplary embodiments of the invention, given by way of illustration and without implied limitation, said description being made in connection with the appended drawing, among which:

FIG. 2 is a graph of the apparent stress curves $F/S_0$ (MPa) as a function of the deformation (%) relating to non-crosslinked test specimens (uncured force-elongation curve or uncured FEC) which were obtained according to the method described in section II.1 and which respectively consist of:
  i. rubber composition from the prior art (C01), the elastomer being natural rubber,
  ii. rubber composition not in accordance with the invention (C04), the elastomer being a stereoregular polyisoprene devoid of pendant groups of formula (I),
  iii. rubber composition in accordance with the invention (C05), the elastomer being a stereoregular polyisoprene bearing pendant groups of formula (I).

Figure 3:
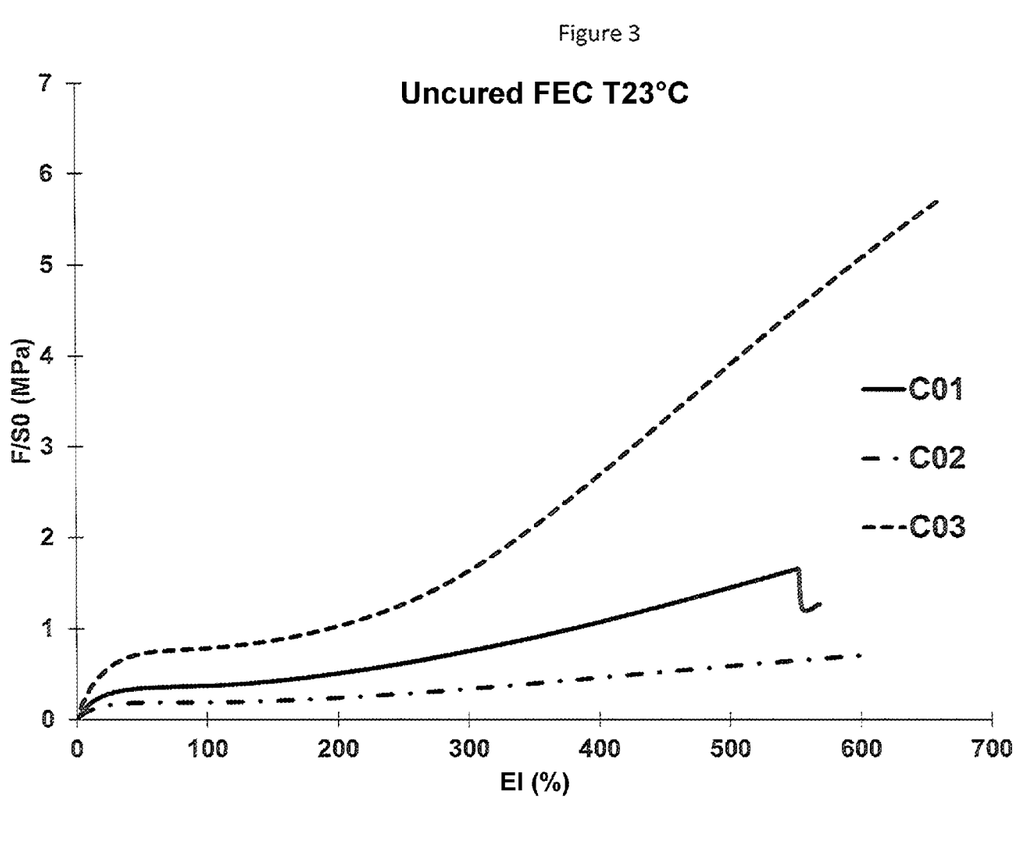
FIG. 3 is a graph of apparent stress curves $F/S_0$ (MPa) as a function of deformation (%) relating to non-crosslinked test specimens (uncured force-elongation curve or uncured FEC) according to another example embodiment.

FIG. 3 is a graph of the apparent stress curves $F/S_0$ (MPa) as a function of the deformation (%) relating to non-crosslinked test specimens (uncured force-elongation curve or uncured FEC) which were obtained according to the method described in section II.1 and which respectively consist of:
  i. rubber composition not in accordance with the invention (C01), the elastomer being natural rubber,
  ii. rubber composition not in accordance with the invention (C02), the elastomer being a stereoregular polybutadiene not bearing any pendant groups of formula (I),
  iii. rubber composition in accordance with the invention (C03), the elastomer being a stereoregular polybutadiene bearing pendant groups of formula (I).

Figure 4:
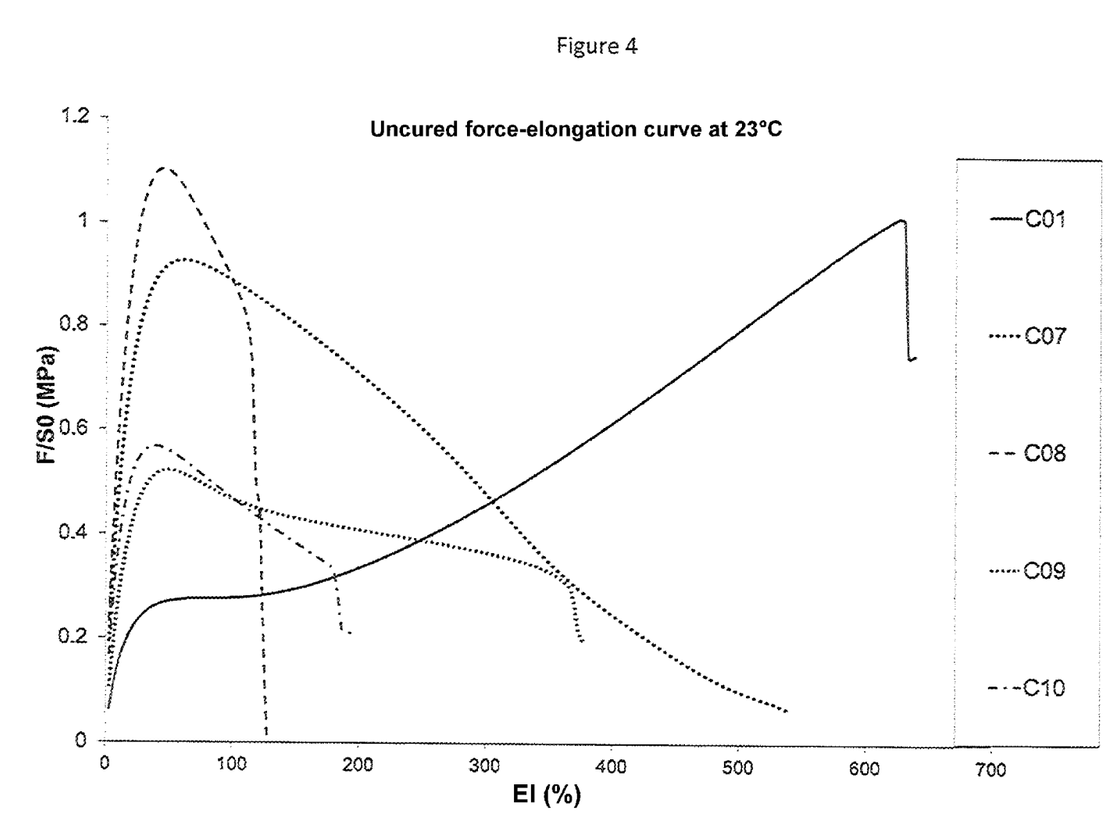
FIG. 4 is a graph of apparent stress curves $F/S_0$ (MPa) as a function of deformation (%) relating to non-crosslinked test specimens (uncured force-elongation curve or uncured FEC) according to yet another example embodiment.

FIG. 4 is a graph of the apparent stress curves $F/S_0$ (MPa) as a function of the deformation (%) relating to non-crosslinked test specimens (uncured force-elongation curve or uncured FEC) which were obtained according to the method described in section II.1 and which respectively consist of:
  i. rubber compositions not in accordance with the invention, the elastomer not being stereoregular and bearing pendant groups of formula (I),
  i. rubber composition not in accordance with the invention, the elastomer being natural rubber.

II. EXEMPLARY EMBODIMENTS

II.1-Measurement and test used: Obtention of the force-elongation curves of non-crosslinked test specimens:

1) Preparation of Slabs Consisting of Non-Crosslinked Rubber Compositions:

The composition passes through a calender, the rolls of which are at 75° C. so as to be in the form of a 2.9 mm thick sheet. This sheet is moulded under pressure in a mould for 10 minutes at 110° C. between two polyester sheets, then extracted from the mould and finally cooled in the open air. A 2.5 mm thick slab is thus obtained.

2) Conditioning of the Slabs Obtained:

Between the time of their preparation and that of the tensile test, each slab is stored in an ambient atmosphere for a duration at least equal to 5 hours and that cannot exceed 8 days.

3) Preparation of Test Specimens from these Slabs:

Each test specimen is then immediately cut in the shape of a dumbbell from one of the slabs thus extracted from the mould, so that it has two ends connected to one another by a rod of thickness E=2.5 mm, of length L=26 mm and of width W=6 mm. The cutting is carried out in such a way that the longitudinal direction L of the test specimen is parallel to the calendering direction.

4) Tensile Tests:

At least three identical test specimens are tested under the same conditions for each of the tensile tests performed.

Each tensile test consists in pulling each test specimen at a constant speed and in recording the change in the tensile force as a function of the displacement of a moving jaw of an INSTRON 4501 tensile machine. This machine is equipped with a force sensor and a means for measuring the displacement of this moving jaw. Each test specimen is held in its broadest part under a clamping pressure P equal to 2 bar.

Each tensile test is carried out at ambient temperature, in an air-conditioned laboratory at 23° C. (±2° C.) and at 50% (±10%) humidity. The constant speed of displacement of the moving jaw is 100 mm/minute. The variations in the tensile force and the displacement of the moving jaw are recorded during each test.

For each test specimen, the following parameters are calculated:
  relative deformation $\alpha(\%)=100 \times D/L$ (D being the displacement of the moving jaw in mm), measured by the sensor of the machine during each test, and L=26 mm is the initial length of the test specimen imposed by "the punch"), and
  apparent stress $F/S_0$ (MPa), which represents the ratio of the force F (in N), measured by the sensor of the machine, to the initial cross section $S_0$ of the test specimen ($S_0$=W.E in mm$^2$, W=6 mm being the width imposed by "the punch" and E=2.5 mm being the thickness of the test specimen before pulling).

For each degree of relative deformation, the average of the corresponding stresses was calculated for three identical test specimens, and thus a stress (average of three measurements)-deformation graph was plotted for each of the test specimens tested.

5) Determination of the Microstructure and the Function Content of the Elastomers by Nuclear Magnetic Resonance (NMR):

The microstructure is determined by $^1$H NMR. The molar content of grafted nitrile oxide compound is also determined by an NMR analysis. The samples are dissolved in a mixture of carbon disulfide and deuterated benzene ($CS_2/C_6D_6$ (50/50)) for the purpose of obtaining a "lock" signal. The spectra are acquired on a 500 MHz Bruker spectrometer equipped with a "5 mm BBFO Z-grad CryoProbe". The quantitative $^1$H NMR experiment uses a simple 30° pulse sequence and a repetition time of 5 seconds between each acquisition. 2D NMR experiments have made it possible to confirm the nature of the grafted moiety by virtue of the chemical shifts of the carbon atoms and protons.

II.2-Preparation of the Rubber Compositions:

Ten rubber compositions C01 to C10 are prepared. Their formulation is given in Table 1, the microstructure of the elastomers is described in Table 2.

In the case of rubber compositions C01, C02, C04 and C06, these compositions are manufactured in the following way: the elastomer, then the reinforcing filler, and also the various other ingredients, with the exception of the vulcanization system, are introduced into an internal mixer (final degree of filling: approximately 70% by volume), the initial vessel temperature of which is approximately 110° C. Thermomechanical working (non-productive phase) is then carried out in one step, which lasts approximately 5 min to 6 min, until a maximum "dropping" temperature of 160° C. is reached. The mixture thus obtained is recovered and cooled and then sulfur and an accelerator of sulfenamide type are incorporated on a mixer (homofinisher) at 23° C., everything being mixed (productive phase) for an appropriate time (for example between 5 and 12 min).

The compositions thus obtained are subsequently calendered, either in the form of slabs (with a thickness ranging from 2 to 3 mm) or thin sheets of rubber, for the measurement of their physical or mechanical properties, or to be used as reinforcement for a tire.

In the case of rubber compositions C03, C05, C07, C08, C09 and C10, the procedure mentioned for compositions C01, C02, C04 and C06 is followed except that before introducing the reinforcing filler, the 1,3-dipolar compound is introduced which is kneaded alone with the elastomer for 1 to 2 minutes at 110° C., which makes it possible to functionalize the elastomer with pendant groups of formula (I) before introducing the other ingredients of the rubber composition. The content of 1,3-dipolar compound introduced into the internal mixer in order to functionalize the elastomer before introducing the other ingredients of the rubber composition appears in Table 1 and as expressed in phr. The content introduced corresponds to a molar degree of modification of 0.6 mol % per 100 moles of the constitutional repeating units of the functional elastomer.

The rubber composition C01 is a reference rubber composition, conventionally used in a reinforcement for a tire, the elastomer being natural rubber.

The rubber compositions C03 and C05 are rubber compositions in accordance with the invention, since they contain a functional elastomer containing more than 90 mol % of cis-1,4 units and a reinforcing filler comprising more than 50% by weight of a carbon black. The functional stereoregular elastomer is synthesized by the reaction of an elastomer that is also stereoregular, IR or BR, and of a 1,3-dipolar compound, 2,4,6-trimethyl-3-((2-methyl-1H-imidazol-1-yl)methyl)benzonitrile oxide of formula (III-a).

The rubber compositions C02 and C04 are not in accordance with the invention, since the stereoregular elastomer, IR or BR, is not functional.

The rubber compositions C06 to C10 are not in accordance with the invention either, because the elastomer of the rubber composition is not stereoregular.

II.3-Results:

The values of the deformations and the stresses at break of the compositions are summarized in Table 3.

FIGS. 2 and 3 and Table 3 show that the rubber compositions C03 and C05 in accordance with the invention have a much higher apparent stress $F/S_0$ than the reference rubber composition C01. The presence of pendant groups of formula (I) on the stereoregular elastomer makes it possible to very significantly improve the mechanical strength properties in the uncured state of the rubber compositions predominantly reinforced with carbon black and based on a synthetic stereoregular elastomer, such as polyisoprene and polybutadiene with high contents of cis-1,4 units. These results make it possible to envisage replacing natural rubber with a synthetic elastomer in rubber compositions reinforced predominantly with carbon black.

FIGS. 2 and 3 and Table 3 also show that the rubber compositions C02 and C04 based on stereoregular elastomer which does not bear pendant groups of formula (I) have a mechanical strength which is much lower than the reference rubber composition C01.

FIG. 4 and Table 3 show that for the rubber compositions C07 to C10 not in accordance with the invention which consist of functional and non-stereoregular elastomers, the apparent stresses $F/S_0$ at high deformation, in particular at more than 400% deformation, remain much lower than those of the reference composition C01 and than those of the rubber compositions in accordance with the invention which consist of stereoregular and functional elastomers.

These unexpected results show that the rubber compositions based on a reinforcing filler predominantly comprising carbon black and an elastomer that is both stereoregular and that bears pendant groups of formula (I) can replace the rubber compositions based on a reinforcing filler predominantly comprising carbon black and natural rubber, in particular in cases where the rubber compositions are used as reinforcement for a tire such as a carcass reinforcement or a crown reinforcement.

TABLE 1

| composition | not in accordance C01 | not in accordance C02 | in accordance C03 | not in accordance C04 | in accordance C05 |
|---|---|---|---|---|---|
| NR [1] | 100 | | | | |
| BR1 (2a) | | 100 | 100 | | |
| BR2 (2b) | | | | | |
| SBR1 (3a) | | | | | |
| SBR2 (3b) | | | | | |
| IR1 (4a) | | | | 100 | 100 |
| IR2 (4b) | | | | | |
| Carbon black | 65 | 65 | 65 | 65 | 65 |
| 6PPD (5) | 2.0 | 2.0 | 2.0 | 2.0 | 2.0 |
| Cobalt salts | 2.0 | 2.0 | 2.0 | 2.0 | 2.0 |
| Stearic acid (6) | 0.6 | 0.6 | 0.6 | 0.6 | 0.6 |
| ZnO (7) | 8.0 | 8.0 | 8.0 | 8.0 | 8.0 |
| Sulfur | 6 | 6 | 6 | 6 | 6 |
| TBBS (8) | 1 | 1 | 1 | 1 | 1 |
| compound III-a | | | 2.7 | | 2.3 |

TABLE 1-continued

| composition | not in accordance C06 | not in accordance C07 | not in accordance C08 | not in accordance C09 | not in accordance C10 |
|---|---|---|---|---|---|
| NR [1] | | | | | |
| BR1 (2a) | | | | | |
| BR2 (2b) | | | | | 100 |
| SBR1 (3a) | 100 | 100 | | | |
| SBR2 (3b) | | | 100 | | |
| IR1 (4a) | | | | | |
| IR2 (4b) | | | | 100 | |
| Carbon black | 65 | 65 | 65 | 65 | 65 |
| 6PPD (5) | 2.0 | 2.0 | 2.0 | 2.0 | 2.0 |
| Cobalt salts | 2.0 | 2.0 | 2.0 | 2.0 | 2.0 |
| Stearic acid (6) | 0.6 | 0.6 | 0.6 | 0.6 | 0.6 |
| ZnO (7) | 8.0 | 8.0 | 8.0 | 8.0 | 8.0 |
| Sulfur | 6 | 6 | 6 | 6 | 6 |
| TBBS (8) | 1 | 1 | 1 | 1 | 1 |
| compound III-a | | 2.3 | 2.3 | 2.3 | 2.7 |

[1]: Natural rubber;
[2]: Polybutadiene;
[3]: Styrene-butadiene copolymer;
[4]: Polyisoprene;
[5]: N-1,3-dimethylbutyl-N-phenyl-para-phenyldiamine ("Santoflex 6-PPD" from Flexsys);
[6]: Stearin "Pristerene 4931" from Uniquema;
[7]: Zinc oxide, industrial grade - Umicore;
[8]: N-(tert-butyl)-2-benzothiazolesulfenamide (Santocure TBBS from Flexsys).

TABLE 2

| polymer | wt % Styrene/ SBR | wt % 1,2 BR/BR | wt % trans-1,4 BR/BR | wt % cis-1,4 BR/BR | Isoprene (mol %) | | | | Tg DSC (° C.) |
|---|---|---|---|---|---|---|---|---|---|
| | | | | | % 1,2 | % 3,4 | % trans PI | % cis PI | |
| SBR1 | 26.0 | 25.0 | 46.0 | 28.0 | — | — | — | — | −50 |
| SBR2 | 21.6 | 13.2 | 53.0 | 33.8 | — | — | — | — | −64 |
| IR1 (IR6596) | — | — | — | — | <0.3 | <0.5 | <1.2 | >98 | −65 |
| IR2 | — | — | — | — | — | 3.8 | 11.4 | 84.8 | −62 |
| BR1 | — | 0.3 | 2.7 | 97.0 | — | — | — | — | −103 |
| BR2 | — | 8.0 | 51.0 | 41.0 | — | — | — | — | −95 |

TABLE 3

| Uncured properties 23° C. | Compositions | | | | | | | | | |
|---|---|---|---|---|---|---|---|---|---|---|
| | C01 | C02 | C03 | C04 | C05 | C06 | C07 | C08 | C09 | C10 |
| Deformation at break (%) | 617 | 725 | 787 | 1572 | 560 | 314 | 613 | 131 | 403 | 230 |
| Apparent stress at break (MPa) | 1.90 | 0.79 | 6.87 | 0.22 | 4.33 | 0.927 | 1 | 1.10 | 0.52 | 0.57 |

The invention claimed is:

1. A rubber composition based at least:

on a functional elastomer, which functional elastomer is a diene elastomer which comprises diene units in the cis-1,4 configuration and pendant groups of formula (I)

(I)

in which:
the $Y_1$, $Y_2$, $Y_3$ and $Y_4$ symbols, which are identical or different, represent an atom or a group of atoms, at least one of the $Y_1$, $Y_2$, $Y_3$ and $Y_4$ symbols denotes an attachment to a diene unit of the elastomer,
the diene units in the cis-1,4 configuration representing at least 90 mol % of the diene units of the functional elastomer,
a reinforcing filler which comprises a carbon black, the carbon black representing more than 50% by weight of the reinforcing filler.

2. The rubber composition according to claim 1, in which the diene units in the cis-1,4 configuration represent at least 95 mol % of the diene units of the functional elastomer, or the diene units in the cis-1,4 configuration represent more than 90 mol % of the constitutional repeating units of the functional elastomer.

3. The rubber composition according to claim 1, in which the content of pendant groups of formula (I) in the functional elastomer is greater than 0 mol % and less than or equal to 3 mol % of the constitutional repeating units of the functional elastomer.

4. The rubber composition according to claim 1, in which $Y_2$ denotes the attachment to a diene unit of the elastomer, $Y_3$ and $Y_4$ are each a hydrogen atom and $Y_1$ represents a hydrogen atom or a carbon chain which may contain at least one heteroatom.

5. The rubber composition according to claim 1, in which the functional elastomer is other than a modified natural rubber.

6. The rubber composition according to claim 1, in which the diene units are 1,3-butadiene units or isoprene units.

7. The rubber composition according to claim 1, in which the functional elastomer is a diene elastomer, a portion of the diene units of which are modified by grafting of a compound, compound C, which contains a group that is reactive with respect to carbon-carbon double bonds and a group of formula (II)

(II)

in which the $Z_1$, $Z_2$, $Z_3$ and $Z_4$ symbols, which are identical or different, represent an atom or a group of atoms, and at least one of the $Z_1$, $Z_2$, $Z_3$ and $Z_4$ symbols denotes an attachment to the reactive group.

8. The rubber composition according to claim 7, in which $Z_2$ denotes the attachment to the reactive group, $Z_3$ and $Z_4$ each represent a hydrogen atom, and $Z_1$ represents a hydrogen atom or a carbon chain which may contain at least one heteroatom.

9. The rubber composition according to claim 7, in which the compound C is a 1,3-dipolar compound, which compound contains a single dipole and the group of formula (II).

10. The rubber composition according to claim 9, in which the 1,3-dipolar compound is an aromatic nitrile monoxide, which aromatic compound contains a single nitrile oxide dipole and a benzene ring, which benzene ring is substituted by the nitrile oxide dipole.

11. The rubber composition according to claim 1, in which the functional elastomer is obtained by modification of a synthetic diene elastomer, the synthetic diene elastomer being a polybutadiene or a synthetic polyisoprene.

12. The rubber composition according to claim 1, in which the carbon black represents from 30 to 80 phr.

13. A composite comprising the rubber composition defined in claim 1 and at least one reinforcing element coated in the rubber composition.

14. A semi-finished article for a tire, which semi-finished article is a reinforcement for a tire and comprises the composite defined in claim 13.

15. A tire comprising a rubber composition defined in claim 1.

16. The rubber composition according to claim 1, in which the functional elastomer is stereoregular.

17. The rubber composition according to claim 1, wherein the carbon black is an ASTM grade of the 300 to 700 series, or the carbon black is a HAF, FF, FEF, GPF, or SRF grade.

* * * * *